(12) United States Patent
Kim

(10) Patent No.: US 7,009,965 B1
(45) Date of Patent: Mar. 7, 2006

(54) LAN INTERFACING APPARATUS

(75) Inventor: Sang Cheol Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 1053 days.

(21) Appl. No.: 09/666,284

(22) Filed: Sep. 21, 2000

(30) Foreign Application Priority Data

Sep. 22, 1999 (KR) .................... 1999-41063

(51) Int. Cl.
*H04L 12/413* (2006.01)

(52) U.S. Cl. .................. 370/366; 370/420; 370/445; 370/448; 370/463

(58) Field of Classification Search ............. 370/445, 370/447, 448, 217, 225, 230, 230.1, 231, 370/237, 238, 248, 357, 412, 419; 340/3.41; 398/36
See application file for complete search history.

(56) References Cited

U.S. PATENT DOCUMENTS

| | | | | |
|---|---|---|---|---|
| 5,418,784 A | * | 5/1995 | Ramakrishnan et al. | .... 370/445 |
| 5,774,658 A | * | 6/1998 | Kalkunte et al. | ........... 709/230 |
| 5,940,399 A | * | 8/1999 | Weizman | .................... 370/445 |
| 6,611,529 B1 | * | 8/2003 | Krishnakumar et al. | .... 370/437 |

* cited by examiner

*Primary Examiner*—Alpus H. Hsu
*Assistant Examiner*—Justin M. Philpott
(74) *Attorney, Agent, or Firm*—Fleshner & Kim, LLP

(57) ABSTRACT

A LAN interface using an Ethernet protocol is disclosed. The interface includes an Ethernet controller, which performs a control operation for LAN interfacing, a codec, which codes and decodes transmission/reception data, and a transceiver, which detects LAN collisions while data is being transmitted/received. It further includes a retransmission control circuit, which is coupled between the Ethernet controller and the codec and outputs the n-th data in accordance with a back-off algorithm after delaying a certain time when the n−1 data collisions occur on the same frame.

31 Claims, 4 Drawing Sheets

TXD: TRANSMISSION DATA
RXD: RECEPTION DATA
TENA: TRANSMISSION ENABLE SIGNAL
RENA: RECEPTION ENABLE SIGNAL
TCLK: TRANSMISSION CLOCK SIGNAL
RCLK: RECEPTION CLOCK SIGNAL
CLSN: COLLISION SIGNAL

LAN INTERFACING APPARATUS

BACKGROUND OF THE INVENTION

1. Field of the Invention

The present invention relates to a Local Area Network (LAN) interfacing apparatus, in particular to a retransmitting control circuit of an internet interfacing apparatus using the LAN.

2. Background of the Related Art

FIG. 1 illustrates a related art LAN system using an Ethernet protocol. As depicted in FIG. 1, a plurality of the LAN interfacing apparatus 120~123 are connected to the LAN.

The LAN mainly uses the Ethernet protocol known as a CSMA/CD (Carrier Sense Multiple Access/Collision Detect). The LAN interfacing apparatus 120~123 are connected to the Internet using the LAN. However, since most of the Ethernet protocols use a half duplex method, the Ethernet protocols cannot receive and transmit at the same time. Accordingly, the LAN interfacing apparatus 120–123 detect an access state of the LAN, and transmit data only when the other LAN interfacing apparatus are not accessing the LAN (in an idle state for 9.6 $\mu$s). In other words, a given LAN apparatus transmits data only when the other LAN interfacing apparatus are in a non-transmission state.

The LAN interfacing apparatus 120~123 connected to the LAN are physically placed apart from each other. Accordingly, more than the two LAN interfacing apparatus may try to transmit data at the same time after detecting the non-transmission state of the other LAN interfacing apparatus. At this time, a data collision occurs on the LAN. Collisions can occur frequently when there is heavy traffic on the LAN.

For example, when a data collision occurs, the corresponding LAN interfacing apparatus 120 outputs a jam signal to the other LAN interfacing apparatus 121~123 to stop the data transmission. Thereafter, the LAN interfacing apparatus 120 waits for a backup time (equal to an integer times 52 $\mu$s) defined in the CSMA/CD specification, and retransmits the data.

FIG. 2 is a block diagram illustrating the related art LAN interfacing apparatus 120~123. As shown in FIG. 2, the LAN interfacing apparatus comprises an Ethernet controller 10, which performs a control operation for the LAN interfacing, a codec 20 which codes and decodes the transmission/reception data, and a transceiver 30, which transmits/receives the data and detects collisions on the LAN.

To perform data transmission, the Ethernet controller 10 outputs a transmission enable signal TENA, a transmission clock signal TCLK, and a transmission data TXD to the codec 20. The codec 20 codes the received transmission data TXD and outputs it to the transceiver 30. The transceiver 30 outputs the coded data to the LAN and thus connects to the internet.

To receive data, the transceiver 30 receives the data from the LAN and outputs it to the codec 20. The codec 20 decodes the received data RXD and outputs it to the Ethernet controller 10, along with a reception enable signal RENA and reception clock signal RCLK.

Meanwhile, the transceiver 30 additionally performs a function of detecting data collisions on the LAN. Thus, if the transmission data TX± and the reception data RX± are detected at the same time, the transceiver 30 outputs a control signal to the codec 20. The codec 20, in turn, outputs a collision signal CLSN informing the Ethernet controller 10 of the data collision.

When the collision signal CLSN is inputted, the Ethernet controller 10 waits for a prescribed time (integer times 52 $\mu$s) in accordance with a back-off algorithm, and then retransmits the data. If the data collision occurs repeatedly, the Ethernet controller 10 retransmits the data up to sixteen times. When the data collision occurs on the same frame after the sixteen retransmission attempts, the Ethernet controller 10 judges it as a transmission failure and performs the retransmission again by using software (S/W).

As described above, the related art LAN interfacing apparatus has several problems. For example, it uses the Ethernet as a LAN protocol. However, when the Ethernet protocol is used, data collisions can occur frequently during periods of heavy traffic on the LAN. Accordingly, data collisions can easily exceed the sixteen retransmission limit, resulting in frequent transmission failures on the background LAN interfacing apparatus using the Ethernet.

Moreover, when the number of data collisions on the LAN exceeds sixteen, the conventional LAN interfacing apparatus performs the retransmission by the S/W. However, this requires additional time (about 10 ms) on an Operating System (OS) to be spent due to the S/W-like task. Accordingly the retransmission speed of the system is lowered.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a LAN interfacing apparatus which substantially obviates the problems caused by the disadvantages of the related art.

It is another object of the present invention to provide a LAN interfacing apparatus capable of reducing a transmission failure rate due to data collisions on the LAN.

It is another object of the present invention to provide a retransmitting control circuit of the LAN interfacing apparatus that is capable of increasing data retransmission speed when data retransmission must be performed due to the data collision more than a prescribed number of times.

To achieve at least the above objects in whole or in parts, there is provided a LAN interfacing apparatus having an Ethernet controller which performs a control operation for the LAN interfacing, a codec, which codes and decodes transmission/reception data, a transceiver which detects the collision on the LAN while data transmitting/receiving, and a retransmission control circuit which is connected between the Ethernet controller and codec and outputs the n-times data in accordance with a back-off algorithm after delaying a certain time when the n−1 times collision occurs on the same frame.

To further achieve at least the above objects in whole or in parts, there is provided a retransmission control circuit, including a collision control unit which detects the LAN collisions and outputs a collision control signal, a reception control unit which performs an OR operation on a collision signal and reception enable signal, a first switch unit which switches a transmission data outputted from the Ethernet controller to a first path or second path in accordance with the collision control signal, a serial/parallel conversion unit which is placed on the second path in order to convert the transmission data outputted from the first switch unit into a parallel data, a buffer which stores outputs of the serial/parallel conversion unit, a parallel/serial conversion unit which converts the transmission data stored in the buffer into a parallel data, a second switch unit which is placed on the first path in order to switch outputs of the first switch unit or the parallel/serial convert unit, and a buffer control unit which controls the output of the buffer and the transmission data write stored on the buffer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
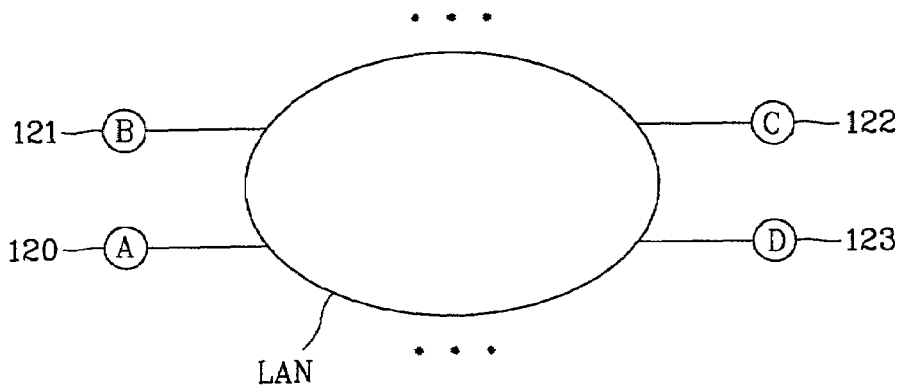
FIG. 1 is a perspective view of a related art LAN system using an Ethernet as a protocol.
Figure 2:
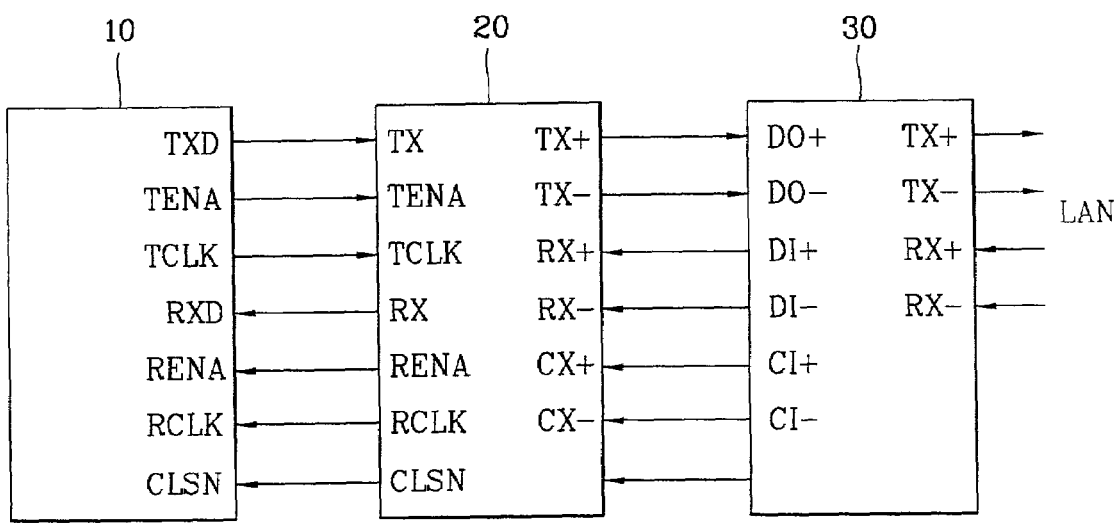
FIG. 2 is a block diagram of a LAN interfacing apparatus of FIG. 1.
Figure 3:
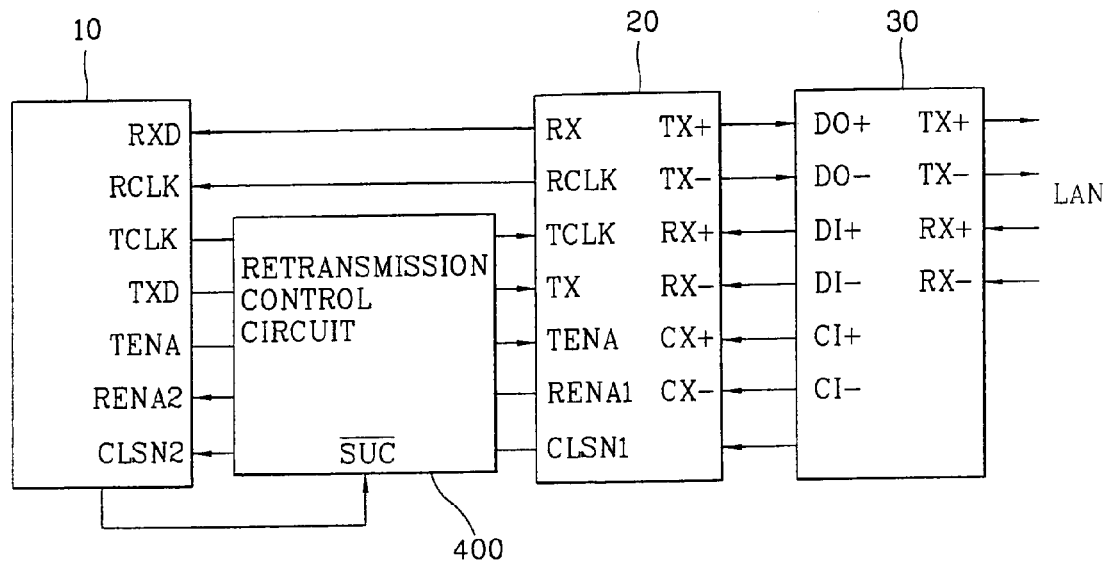
FIG. 3 is a block diagram of the LAN interfacing apparatus according to a preferred embodiment of the present invention.

As illustrated in FIG. 3, the LAN interfacing apparatus of a preferred embodiment of the present invention includes an Ethernet controller 10, a codec 20, a transceiver 30, and a retransmission control circuit 400. At this time, the parts overlapped with the conventional LAN interfacing apparatus will have the same reference numerals.

After a collision occurs n−1 times on the LAN, the retransmission control circuit 400 stores the n-th transmission data in accordance with a back-off algorithm. It then outputs this data to a network after a prescribed delay time. Thereafter, if the collision occurs again during the n-th data transmission, the retransmission control circuit 400 retransmits the data through a H/W-like circuit construction.

Figure 4:
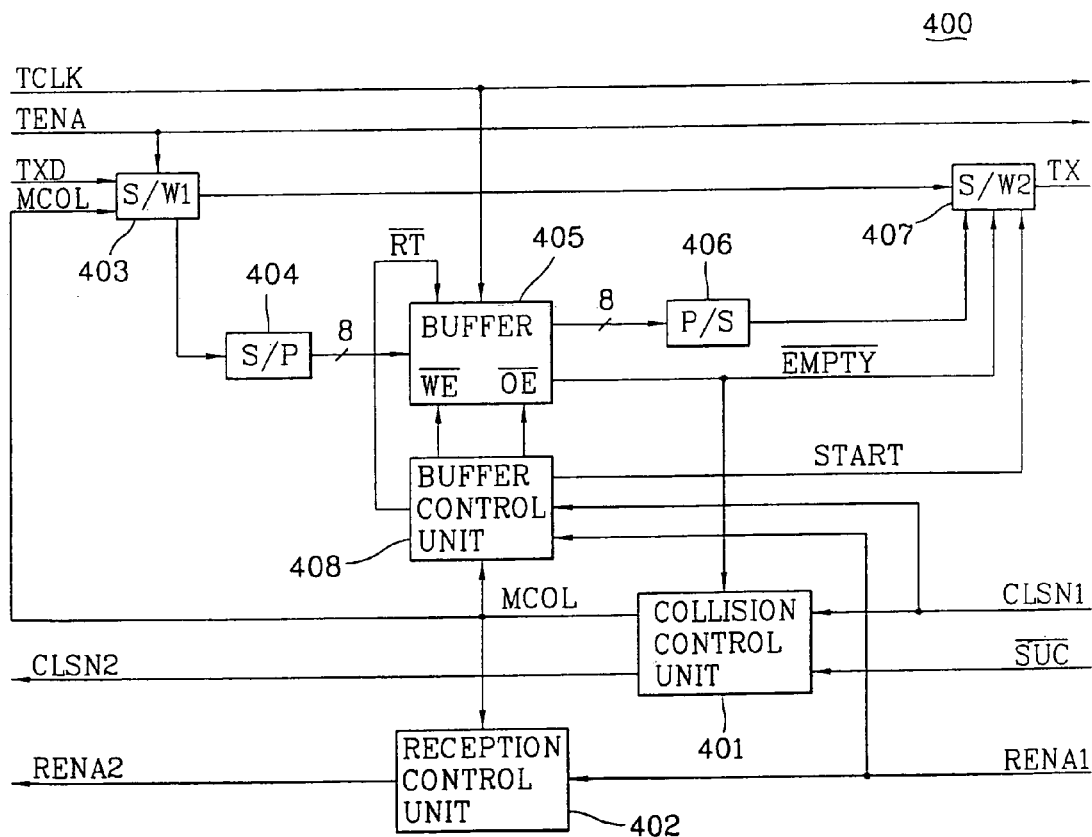
FIG. 4 is a circuit diagram of a retransmission control circuit of FIG. 3.

FIG. 4 illustrates the retransmission control circuit 400. The retransmission control circuit 400 includes a collision control unit 401, a reception control unit 402, and first and second switch units 403 and 407. It also includes a serial/parallel conversion unit S/P 404, a buffer 405, a parallel/serial conversion unit P/S 406, and a buffer control unit 408.

The collision control unit 401 detects the nth-1 collision and outputs a collision control signal MCOL. It also cuts off a collision signal CLSN2, which will be inputted to the Ethernet controller 10 when the nth-1 collision on the LAN occurs.

Figure 5:
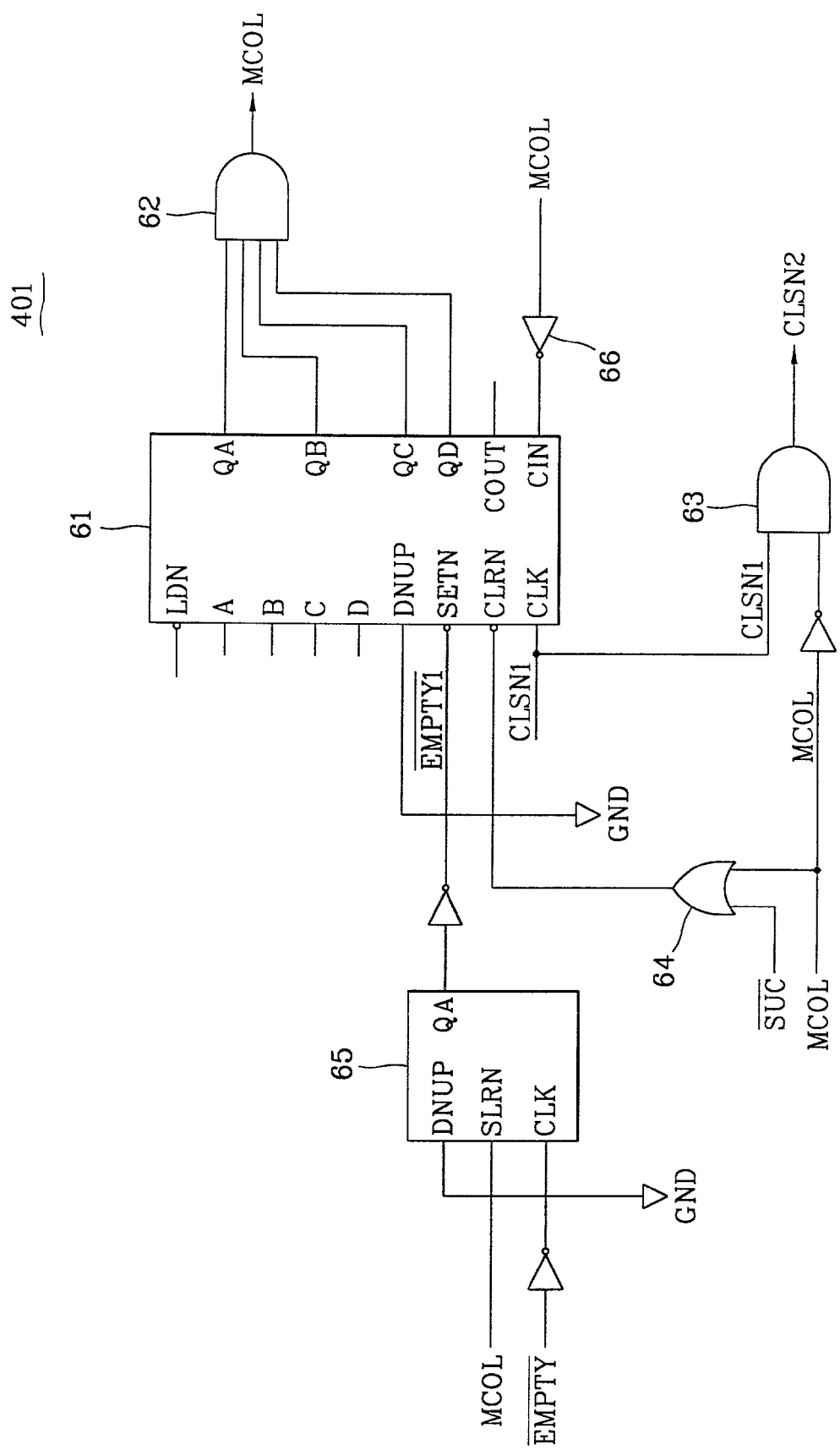
FIG. 5 is a circuit diagram of a collision control unit of FIG. 4.

As depicted in FIG. 5, the collision control unit 401 includes a first counter 61, AND gates 62 and 63, an OR gate 64, and a second counter 65.

The collision control unit 401 receives a collision signal CLSN1 from the codec 20 and counts up to the nth-1 collision. The AND gate 62 outputs the collision control signal MCOL having a high level when the nth-1 collision occurs. The AND gate 63 then cuts off the collision signal CLSN2 to be inputted to the Ethernet controller 10 after the nth-1 collision has occurred. The OR gate 64 and second counter 65 then reset a count value of the first counter 61.

The OR gate 64 clears the first counter 61 in accordance with a low level frame success signal $\overline{SUC}$. The frame success signal $\overline{SUC}$ is outputted from the Ethernet controller 10 when the nth-1 data transmission is completed in accordance with the back-off algorithm at each frame. When the collision control signal MCOL becomes high level, however, the OR gate cannot clear the first counter 61 by using the frame success signal $\overline{SUC}$. Accordingly, the first counter 61 is reset by the second counter 65.

The second counter 65 is cleared by the high level collision control signal MCOL. The second counter 65 resets the first counter 61 by outputting the count value "1" when an empty signal $\overline{EMPTY}$ is changed from a high level to a low level. This change indicates that the data stored in the buffer 405 is all outputted to a P/S 406.

Figure 6:
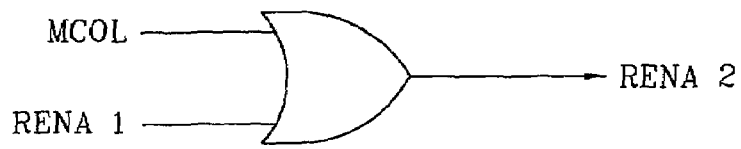
FIG. 6 is a circuit diagram of a reception control unit of FIG. 4.

When the nth-1 collision occurs, the reception control unit 402 outputs a reception enable signal RENA2 to the Ethernet controller 10. This prevents the next frame transmission from the Ethernet controller 100. Here, the reception control unit 402 is implemented by the OR gate as shown in FIG. 6.

Figure 7:
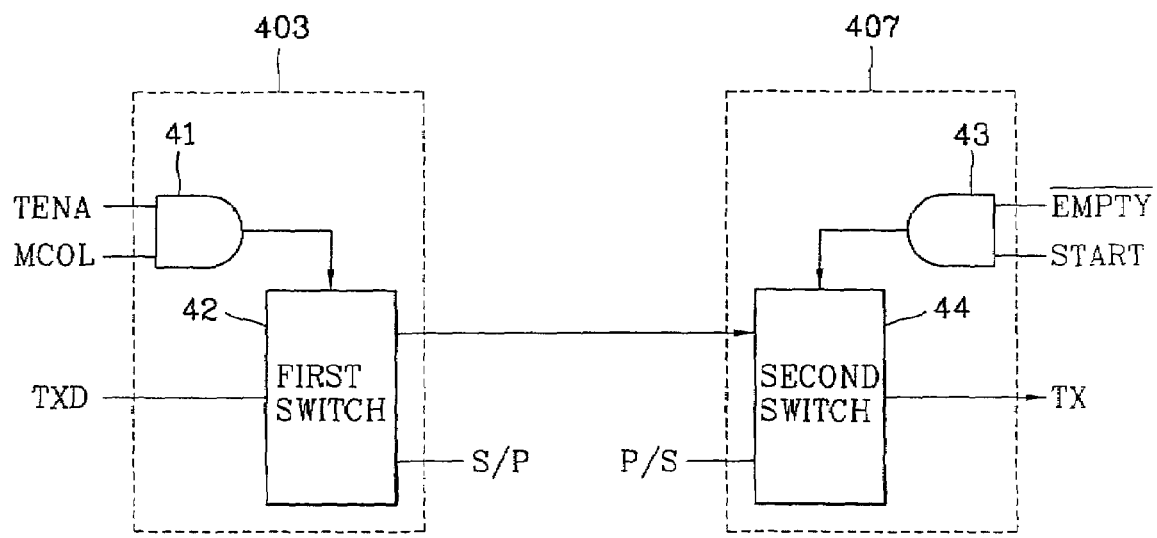
FIG. 7 is a circuit diagram of a first and second switch unit of FIG. 4.

As depicted in FIG. 7, the first switch unit 403 is implemented by an AND gate 41 and a first switch 42. The first switch unit 403 switches the transmission data TXD to the first switch unit 407 or the serial/parallel conversion unit 404 in accordance with the collision control signal MCOL. That is, when the collisions occur fewer than n−1 times or not at all, the first switch unit 403 switches the transmission data TXD to the second switch unit 407. When the nth-1 collision occurs, however, the n-th retransmission data TXD switches to the S/P 404.

The S/P 404 converts the transmission data TXD inputted from the first switch unit 403 into parallel data, and the P/S 406 converts the parallel data outputted from the buffer 405 into serial data.

The buffer 405 stores the transmission data TXD outputted from the S/P 404, and also outputs the high level empty signal $\overline{EMPTY}$ when there is data stored.

The second switch unit 407 shown in FIG. 7 includes an AND gate 43 and a second switch 44. The second switch 44 switches the output of the first switch unit 403 or the P/S 406 to the codec 20 in accordance with the empty signal $\overline{EMPTY}$ and start signal START. Specifically, when the empty signal $\overline{EMPTY}$ and the start signal START are set to high levels (indicating that there is data stored in the buffer 405 and the start signal is active), the second switch unit 407 switches the output of the P/S 406 to the codec 20.

The buffer control unit 408 controls write, output, and retransmission operations of the transmission data TXD outputted from the buffer 405. It also controls the switching operation of the second switch unit 407.

Figure 8:
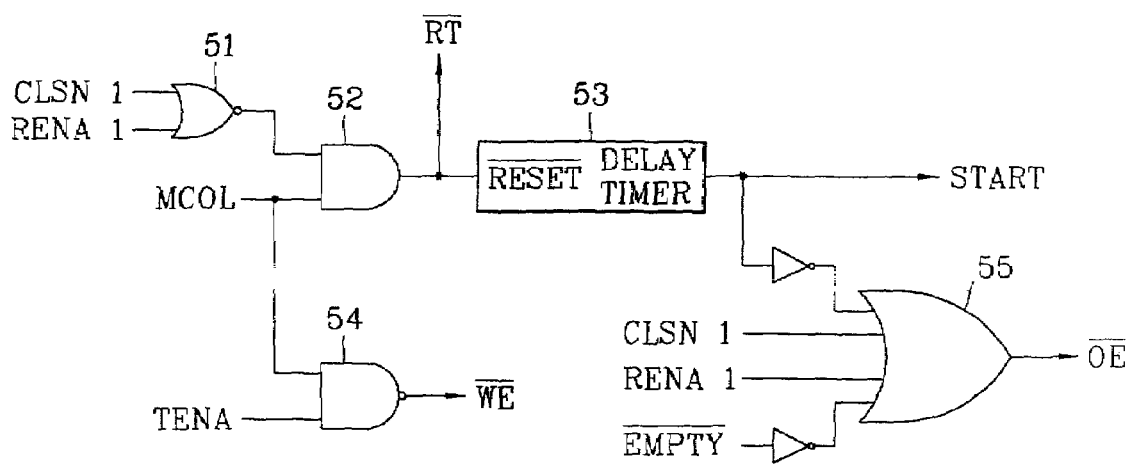
FIG. 8 is a circuit diagram of a buffer control unit of FIG. 4.

As depicted in FIG. 8, the buffer control unit 408 includes a NOR gate 51 for NORing the collision signal CLSN1 with the reception enable signal RENA1 and an AND gate 52 for ANDing the output of the NOR gate 51 and the collision control signal MCOL. The AND gate 52 outputs a retransmission signal $\overline{RT}$. The buffer control unit 408 further includes a delay timer 53, which is reset by the retransmission signal $\overline{RT}$ and outputs the start signal START after a prescribed time, such as 52 $\mu s \times$ an integer value. A NAND gate 54 is also provided for NANDing the collision control signal MCOL and the transmission enable signal TENA and generating a write enable signal $\overline{WE}$, and an OR gate is provided for Oring an inverted start signal START, the collision signal CLSN1, the reception enable signal RENA, and an inverted empty signal $\overline{EMPTY}$ to generate an output enable signal $\overline{OE}$.

The operation of the LAN interfacing apparatus of a preferred embodiment of the present invention will now be described. Here, for purposes of example, the prescribed number of collisions on the LAN (n−1) is presumed to be fifteen.

The Ethernet controller 10 transmits the data per one frame unit. When a LAN collision occurs, up to sixteen retransmission attempts are performed for each frame, in accordance with the back-off algorithm. The size of the frame data, including the preamble, is preferably a maximum of 1524 bytes.

The retransmission control circuit 400 counts the collision per each frame. When a collision occurs fewer than the fifteen times or does not occur at all for the single frame, the retransmission control circuit 400 transmits the transmission data TXD through a normal path. Specifically, it is transmitted through the first and the second switch unit 403, 407, as shown in FIG. 4.

On the contrary, if the fifteen data collision occur for the same frame, there is a high possibility that the sixteenth data transmission will result in a collision. Accordingly, the retransmission control circuit 400 stores the sixteenth data in the buffer in accordance with the back-off algorithm on behalf of the real network. It then transmits it from the buffer after a prescribed delay (for example, a factor of 52 μs). The Ethernet controller 10 determines whether the frame transmission has been completed successfully and prepares the next frame, and the frame stored in the buffer of the retransmission control circuit 400 is retransmitted in accordance with the H/W-like. Accordingly, the transmission failure rate can be lowered by preventing the sixteenth transmission failure.

As depicted in FIG. 4, when the fifteenth data collision is detected for the same frame, the retransmission control circuit 400 stores the transmission data TXD in the buffer 405 through the first switch unit 403 and S/P 407. It outputs the stored data through the P/S 406 and second switch unit 407. Here, the sixteenth data transmission can be delayed for a prescribed time. The delay is preferably a value of 52 μs×an integer. The delay is effected by adjusting the output time of the transmission data TXD stored on the buffer 405 by using the buffer control unit 408. The data is then transmitted.

If a collision occurs on the sixteenth data transmission, the retransmission control circuit 400 retransmits the data through the hardware-like circuit construction of itself. As shown in FIG. 4, when the sixteenth LAN collision occurs, the buffer 405 retransmits the stored transmission data TXD to the P/S 406, and then to the second switch unit 407 in accordance with the retransmission signal /RT outputted from the buffer control unit 408.

Referring to FIG. 4, the operation of the retransmission control circuit 400 will now be described. When fifteen collisions occur on one frame, there is high possibility that the sixteenth data transmission will also result in collision. Accordingly, if fifteen collisions have occurred, the collision control unit 401 outputs the high level collision control signal MCOL to the reception control unit 402, first switch unit 403, and buffer control unit 408. Also, the collision control unit 401 cuts off the collision signal CLSN2 from inputting to the Ethernet controller 10.

Accordingly, the Ethernet controller 10 outputs the sixteenth transmission data TXD to the retransmission control circuit 400 in accordance with the back-off algorithm, and outputs a low level frame success signal $\overline{SUC}$ indicating transmission completion of the transmission data TXD. The sixteenth transmission data TXD outputted from the Ethernet controller 10 is sent to the buffer 405 for storage via the first switch unit 403 of the retransmission control circuit 400 and the S/P 404. In addition, the Ethernet controller 10 outputs the low level frame success signal $\overline{SUC}$ and prepares the data transmission of the next frame.

The reception control unit 402 generates the reception enable signal RENA2 in accordance with the high level collision control signal MCOL, and prevents the Ethernet controller 10 from transmitting the next frame until the frame data stored in the buffer 405 is fully transmitted. At this time, when the reception is normal, only the reception data RXD is received in accordance with the active transmission control signal RENA2.

A write and output operation of the reception data RXD inputted to the buffer 405 is performed in accordance with the write enable signal $\overline{WE}$ and the output enable signal $\overline{OE}$ of the buffer control unit 408. In other words, the NAND gate 54 FIG. 8) outputs the low level write enable signal $\overline{WE}$ in accordance with the high level collision control signal MCOL in order to store the received data RXD in the buffer 405. The buffer control unit 408 also generates the low level output enable signal $\overline{OE}$ after a prescribed time, for example, 52 μs×an integer, in order to output the transmission data TXD stored on the buffer 405.

Accordingly, the sixteenth transmission data TXD stored on the buffer 405 is inputted to the second switch unit 407 through the P/S 406 after the prescribed delay. As shown in FIG. 7, the switching point of the second switch unit 407 is determined by the empty signal $\overline{EMPTY}$ and start signal START. That is, the second switch unit 407 switches the transmission data TXD outputted from the P/S 406 to the codec 20 when there is the transmission data TXD stored in the buffer 405, and the start signal START is generated after the prescribed delay.

When a data collision occurs on the same part of the sixteenth transmission data TXD transmitted through the second switch unit 407, the buffer control unit 408 outputs the low level retransmission signal $\overline{RT}$ and the output enable signal $\overline{OE}$ to the buffer 405, and the high level start signal START as depicted in FIG. 8. Accordingly, the buffer 405 retransmits the stored transmission data TXD all over again in accordance with the retransmission signal $\overline{RT}$ and the output enable signal $\overline{OE}$.

When the transmission of the transmission data TXD stored in the buffer 405 is completed and the empty signal $\overline{EMPTY}$ is at a low level, the second counter 65 resets the count value of the first counter 61, and the AND gate 62 outputs the low level collision control signal MCOL (see FIG. 5). Here, the inverter 66 stops the operation of the first counter 61 in accordance with the low level collision control signal MCOL. Accordingly, the retransmission control unit 400 transmits the data of the next frame transmitted from the Ethernet controller 10 through the normal path.

It should be understood that any number of collisions could be used to trigger this system, and fifteen is used by way of example only. Moreover, the delay time could be set to any desired value. Additionally, these values can be changed during the operation of the system or set in advance.

As described above, the present invention as embodied and generally described herein has several advantages. For example, the system is capable of lowering the transmission failure by delaying the n-th data transmission for a prescribed time in accordance with the back-off algorithm when the nth-1 collision occurs.

In addition, when the collision occurs on the n-th data transmission, the present invention is capable of increasing retransmission speed by retransmitting the data through the H/W-like circuit construction.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A Local Area Network (LAN) interfacing apparatus, comprising:
   an Ethernet controller, which performs a control operation for LAN interfacing;
   a codec, which is coupled to the Ethernet controller and which codes and decodes transmission/reception data;
   a transceiver, which is coupled to the codec and which transmits/receives data and detects data collisions on a LAN; and
   a retransmission control circuit, which is coupled between the Ethernet controller and the codec, to retransmit data after a prescribed delay period when a prescribed number of collisions occur on the LAN, wherein the retransmission control circuit comprises:
      a collision control unit to detect a collision and output a collision control signal;
      a first switch to switch a transmission data path output from the Ethernet controller between a first path and a second path based on the collision control signal;
      a buffer on the second path to store data;
      a second switch coupled to the first switch along the first path and coupled to the buffer along the second path, the second switch to pass the data to the codec.

2. The apparatus of claim 1, wherein the retransmitting control circuit retransmits an n-th data all over again when the n-th data collides on the LAN, wherein n is greater than or equal to two.

3. The apparatus of claim 1, wherein the retransmission control circuit comprises:
   the collision control unit to detect an (n−1)th collision and output the collision control signal, wherein n is greater than or equal to two;
   a reception control unit to logically combine the collision control signal and a reception enable signal;
   the first switch to switch a transmission data outputted from the Ethernet controller to one of the first path and the second path, in accordance with the collision control signal;
   a serial/parallel converter to convert the transmission data outputted from the first switch along the second path into parallel data;
   the buffer to store an output of the serial/parallel converter;
   a parallel/serial converter to convert the transmission data stored in the buffer into serial data;
   the second switch to switch the output of the first switch or the parallel/serial converter; and
   a buffer control unit to control write and output operations of the transmission data stored in the buffer, wherein the prescribed number of collisions is n.

4. The apparatus of claim 3, wherein the reception control unit prevents a transmission of a next frame by outputting a reception enable signal to the Ethernet controller when the collision control signal is activated.

5. The apparatus of claim 3, wherein the collision control unit cuts off a collision signal inputted to the Ethernet controller from the codec after a prescribed number of collisions occur.

6. The apparatus of claim 3, wherein the collision control unit comprises:
   a first counter to count a number of collision signals outputted from the codec;
   a first logic gate to output the collision control signal by logically combining the outputs of the first counter;
   a second logic gate to prevent the transmission of the collision signal to the Ethernet controller when the collision control signal is activated;
   a third logic gate to clear the first counter by logically combining the collision signal and a frame success signal outputted from the Ethernet controller; and
   a second counter to reset the first counter in accordance with an empty signal outputted from the buffer.

7. The apparatus of claim 6, wherein the first counter is cleared by the third logic gate before the prescribed number of collisions occur, and is cleared by the second counter after the prescribed number of collisions occur.

8. The apparatus of claim 7, wherein the first counter is a four-bit counter, the second counter is two-bit counter, and the second counter resets the first counter when the transmission data stored in the buffer is fully transmitted.

9. The apparatus of claim 6, further comprising an inverter to stop the operation of the first counter in accordance with the output of the first logic gate when the first counter is reset by the second counter.

10. The apparatus of claim 3, wherein the first switch switches the transmission data to the serial/parallel converter when fewer than the prescribed number of LAN collisions occur, and switches the transmission data to the second switch when the prescribed number of collisions occurs.

11. The apparatus of claim 10, wherein the first switch comprises:
   a logic gate to logically combine a transmission enable signal outputted from the Ethernet controller with the collision control signal outputted from the collision control unit; and
   a third switch to switch the transmission data to the serial/parallel converter when the transmission enable signal and the collision control signal are high-active.

12. The apparatus of claim 3, wherein the second switch switches the output of the parallel/serial converter to the codec when data is stored in the buffer and a start signal of the buffer control unit is a high level.

13. The apparatus of claim 12, wherein the second switch comprises:
   a logic gate for logically combining an empty signal outputted from the buffer and the start signal of the buffer control unit; and
   a third switch to switch the output of the parallel/serial converter to the codec when the empty signal and start signal are at a high level.

14. The apparatus of claim 3, wherein the buffer control unit delays the output of the transmission data stored in the buffer for a period of an integer multiple of 52 $\mu$s.

15. The apparatus of claim 3, wherein the buffer control unit comprises:
  a first logic gate to logically combine the collision signal outputted from the codec with the reception enable signal;
  a second logic gate to logically combine the output of the first logic gate and the collision control signal to output a retransmission signal;
  a delay timer, which is reset by the retransmission signal, and outputs a start signal after a prescribed delay period;
  a third logic gate to logically combine a transmission enable signal outputted from the Ethernet controller and the collision control signal, and to generate a write enable signal of the buffer; and
  a fourth logic gate to logically combine an inverted start signal, the collision signal, the reception enable signal, and an inverted empty signal to generate an output enable signal.

16. The apparatus of claim 15, wherein the second logic gate outputs the retransmission signal when a prescribed transmission data collides on the LAN.

17. A retransmitting control circuit of a Local Area Network (LAN) interfacing apparatus, comprising:
  a collision control unit, which detects a (n−1)th collision, outputs a collision control signal, and cuts off a collision signal inputted to an Ethernet controller from a codec when the (n−1)th collision occurs, wherein n is greater than or equal to two;
  a reception control unit, which stops a transmission of a next frame by outputting a reception enable signal to the Ethernet controller in response to the collision control signal;
  a first switch, which switches transmission data outputted from the Ethernet controller to a first path or a second path in response to the collision control signal;
  a serial/parallel converter, which is placed on the second path to convert transmission data outputted from the first switch into parallel data;
  a buffer, which stores an output of the serial/parallel converter;
  a parallel/serial converter, which converts an output of the buffer into parallel data;
  a second switch, which is placed on the first path to switch between an output of the first switch or the parallel/serial converter; and
  a buffer control unit, which controls write and output operations of the transmission data stored in the buffer.

18. The circuit of claim 17, wherein the collision control unit comprises:
  a first counter to count a number of collision signals outputted from the codec;
  a first logic gate to logically combine the output of the first counter to output the collision control signal;
  a second logic gate, which prevents the collision signal from being inputted to the Ethernet controller when the collision signal is activated;
  a third logic gate to clear the first counter by logically combining the collision signal and a frame success signal outputted from the Ethernet controller; and
  a second counter to reset the first counter in response to an empty signal outputted from the buffer.

19. The circuit of claim 18, wherein the first counter is cleared by the third logic gate before the (n−1)th collision occurs, and is cleared by the second counter after the (n−1)th collision occurs.

20. The circuit of claim 18, wherein the second counter resets the first counter when the transmission data stored in the buffer is all transmitted.

21. The circuit of claim 17, wherein the first switch switches the transmission data to the serial/parallel converter when the collision control signal and the transmission enable signal outputted from the Ethernet controller are in a high level.

22. The circuit of claim 17, wherein the second switch switches the output of the parallel/serial converter to the codec when data is stored in the buffer and the start signal of the buffer control unit is at a high level.

23. The circuit of claim 22, wherein the second switch unit comprises:
  a first logic gate to logically combine the empty signal outputted from the buffer with the start signal of the buffer control unit; and
  a second switch to switch the output of the parallel/serial converter to the codec when the empty signal and start signal are at a high level.

24. The circuit of claim 17, wherein the buffer control unit comprises:
  a NOR gate for NORing the collision signal and the reception enable signal outputted from the codec;
  an AND gate for ANDing the output of the NOR gate and the collision control signal to output the retransmission signal;
  a delay timer which is reset by the retransmission signal, and outputs the start signal after a prescribed delay time;
  a NAND gate for NANDing the collision control signal and the transmission enable signal to generate a write enable signal of the buffer; and
  an OR gate for ORing an inverted start signal, the collision signal, the reception enable signal, and an inverted empty signal to generate an output enable signal.

25. The circuit of claim 23, wherein the AND gate outputs a retransmission signal in response to the output of the NOR gate when the LAN collision occurs on some part of the sixteenth transmission data, and wherein n=16.

26. The apparatus of claim 1, wherein the retransmission control circuit outputs an n-th data packet in accordance with a back-off algorithm after collisions of n−1 data packets of a single frame, wherein n is greater than or equal to two.

27. The apparatus of claim 3, wherein the serial/parallel converter is placed on the second path and the second switch is placed on the first path.

28. The apparatus of claim 6, wherein the first and second logic gates are AND gates and the third logic gate is an OR gate.

29. The apparatus of claim 15, wherein the first logic gate is a NOR gate, the second logic gate is an AND gate, the third logic date is a NAND gate, and the fourth logic gate is an OR gate, and wherein the prescribed delay period is an integer factor of 52 microseconds.

30. The circuit of claim 17, wherein the retransmission control unit is coupled to the Ethernet controller and the codec of the local area network interfacing apparatus.

31. The circuit of claim 18, wherein the first and second logic gates are an AND gate, and the third logic gate is an OR gate.

* * * * *